(12) United States Patent
Seo

(10) Patent No.: US 8,468,996 B2
(45) Date of Patent: Jun. 25, 2013

(54) BALANCE SHAFT MODULE OF ENGINE

(75) Inventor: Seungwoo Seo, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 418 days.

(21) Appl. No.: 12/842,374

(22) Filed: Jul. 23, 2010

(65) Prior Publication Data

US 2011/0120407 A1    May 26, 2011

(30) Foreign Application Priority Data

Nov. 23, 2009  (KR) .................. 10-2009-0113287

(51) Int. Cl.
*F02F 1/00* (2006.01)
(52) U.S. Cl.
USPC ........................................ 123/192.2; 74/603
(58) Field of Classification Search
USPC ........................................ 123/192.2; 74/603
See application file for complete search history.

(56) References Cited

U.S. PATENT DOCUMENTS 7,490,585 B2    2/2009  Friedrich
7,617,810 B1 *  11/2009  Phillips et al. .............. 123/192.2

FOREIGN PATENT DOCUMENTS

| JP | 2008-169906 A | 7/2008 |
| JP | 2009-79673 A | 4/2009 |
| KR | 10-0356694 B1 | 10/2002 |

* cited by examiner

*Primary Examiner* — Noah Kamen
(74) *Attorney, Agent, or Firm* — Morgan, Lewis & Bockius LLP

(57) ABSTRACT

A balance shaft module of an engine may include a balance weight shaped eccentrically in a radial direction from the axial center of a balance shaft, and a balance cover combined with the balance weight and defining a circumferentially-uniform outer surface with the balance weight with respect to the axial center of the balance shaft.

4 Claims, 4 Drawing Sheets

BALANCE SHAFT MODULE OF ENGINE

CROSS-REFERENCE TO RELATED APPLICATIONS

The present application claims priority to Korean Patent Application Number 10-2009-0113287 filed Nov. 23, 2009, the entire contents of which application is incorporated herein for all purposes by this reference.

BACKGROUND OF THE INVENTION

1. Field of the Invention

The present invention relates to a balance shaft module of an engine, in more detail, a technology associated with the structure of a balance shaft module which makes it possible to reduce power loss of an engine and improves fuel consumption of a vehicle.

2. Description of Related Art

Balance shaft modules are provided to attenuate and reduce vibration of an engine, usually disposed under the cylinder block to operate with the crankshaft, and sunk in the engine oil of the oil fan.

Therefore, when the engine is in operation, a balance shaft 500 having the shape shown in FIG. 1 and included in the balance shaft module causes oil churning while rotating in the engine oil.

That is, the churning is a phenomenon in which a rotator hits fluid, and in this configuration, balance weights 502 of balance shaft 500 hit the engine oil in rotation.

The churning causes loss of rotational power, excessively consumes the oil, increases the oil temperature, deteriorates fuel efficiency, and produces a noise.

The problems of the churning described above are based on rotational resistance that balance weights 502 receives from the engine oil while rotating.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a balance shaft module of an engine which minimizes loss of power of the engine, prevents excessive consumption of oil, prevents increase of oil temperature and a noise, and improves fuel efficiency, by preventing churning in which balance weights hit the engine oil when balance shafts are in rotation to significantly reducing rotational resistance of the engine oil.

In an aspect of the present invention, the balance shaft module of an engine, may include a balance weight shaped eccentrically in a radial direction from the axial center of a balance shaft; and a balance cover combined with the balance weight and defining a circumferentially-uniform outer surface with the balance weight with respect to the axial center of the balance shaft.

The circumferentially-uniform outer circumference of the balance cover and the balance weight may form a circular circumference with respect to axial center of the balance shaft.

The balance cover may have a hollow shell structure and has locking protrusions, and wherein the balance weight has locking grooves to receive the locking protrusions, wherein the balance weight is formed in a semicircular cross-sectional column having an arc surface protruding outside from the axial center of the balance shaft, the balance cover has an arc portion defining the uniform outer circumference together with the arc surface of the balance weight and flat sides connected to both lateral sides of the arc portion to cover the balance shaft, and the locking protrusions bend inward from both side ends of the arc portion.

In another aspect of the present invention, the balance shaft module of an engine, may include a balance weight having an arch surface radially and eccentrically protruding from the axial center of a balance shaft; and a balance cover formed to have a structure defining smooth curved surface connected with both side ends of the arc surface of the balance weight when being combined with the balance weight to cover the balance shaft, wherein the balance cover is formed of a hollow shell shape, the balance cover has locking protrusions to be combined with the balance weight, and the balance weight has locking grooves where the locking protrusions are inserted.

The balance cover may be formed in a hollow shell shape, and the balance cover may be fixed to the balance weight by fixing bolts.

According to the present invention, it is possible to minimize loss of power of the engine, prevent excessive consumption of oil, prevent increase of oil temperature and a noise, and improve fuel efficiency, by preventing churning in which balance weights hit the engine oil when balance shafts are in rotation to significantly reducing rotational resistance of the engine oil.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
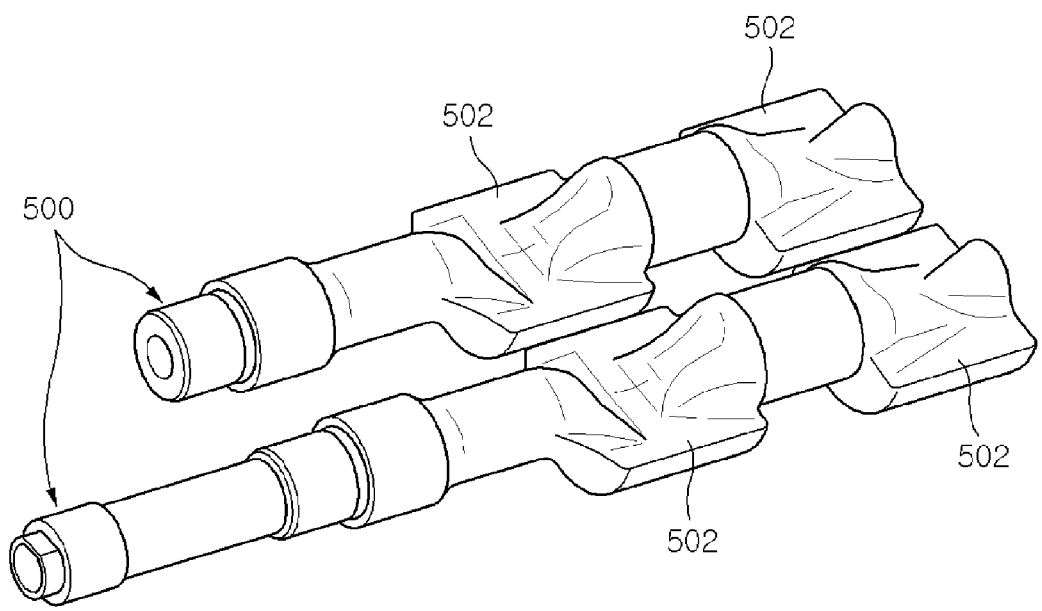
FIG. 1 is a view showing a balance shaft and balance weights of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
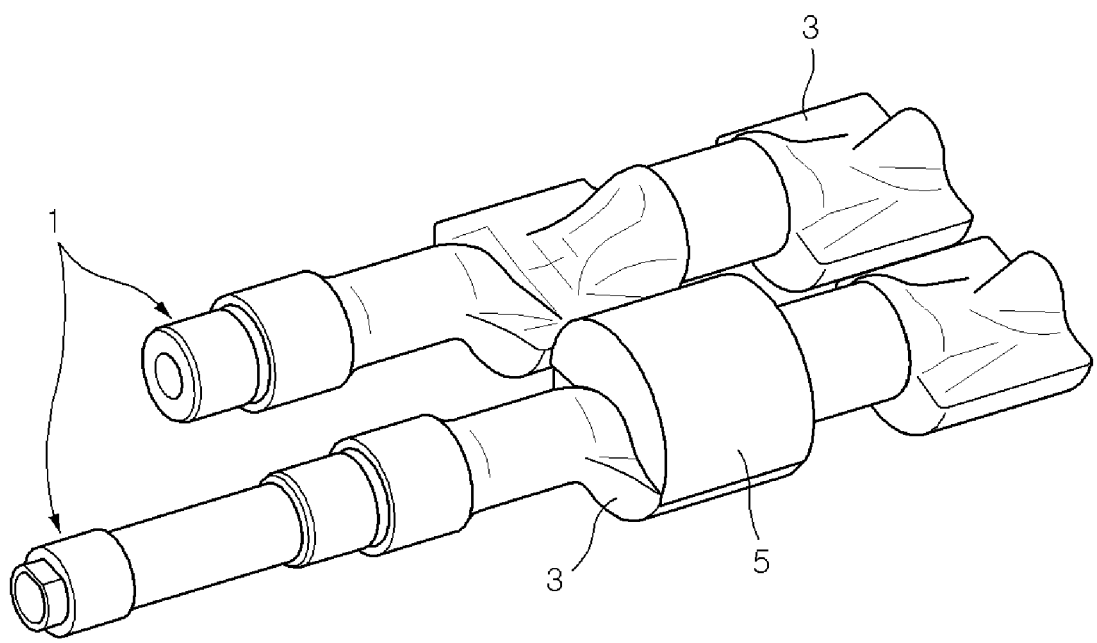
FIG. 2 is a view showing an exemplary balance shaft module of an engine according to the present invention.
Figure 3:
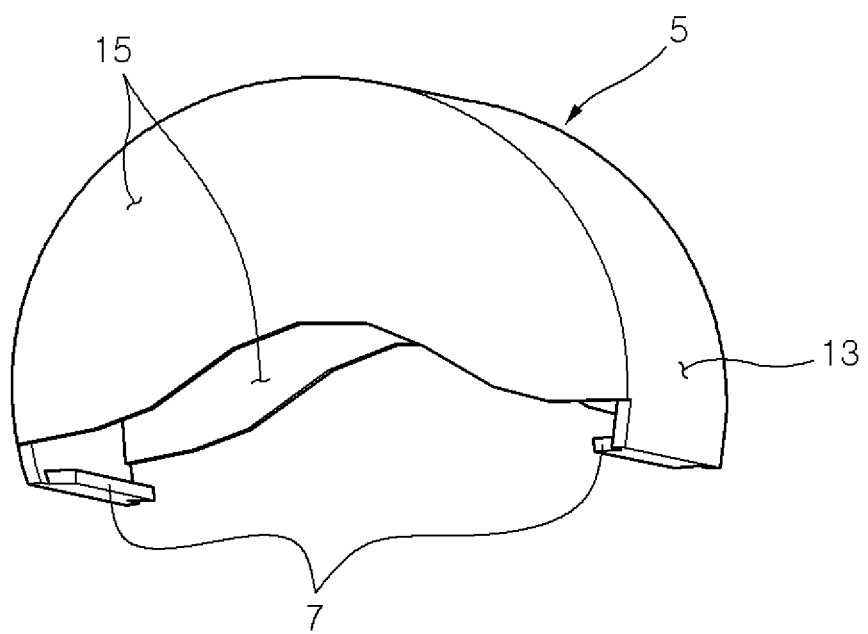
FIG. 3 is a view showing in detail the balance cover of FIG. 2.
Figure 4:
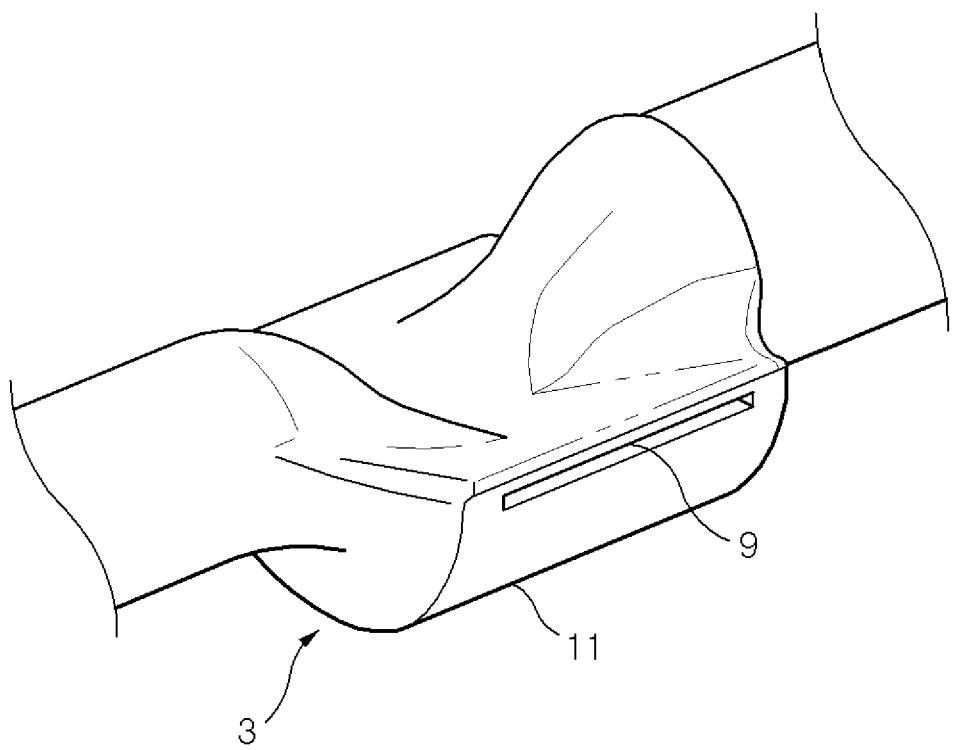
FIG. 4 is a view showing in detail the balance weight of FIG. 2.

Referring to FIGS. 2 to 4, an embodiment of the present invention includes balance weights 3 shaped eccentrically from the axial centers of balance shafts 1, and balance covers 5 combined with balance weights 3 and defining a circumferentially uniform outline with respect to the axial centers of balance shafts 1 together with balance weights 3.

That is, since balance weight 3 shaped eccentrically from the axial center of balance shaft 1 generates churning by hitting the oil in rotation, the space where balance weight 3 is not formed from the center of balance shaft 1 is filled with balance cover 5 such that balance weight 3 has a complete circular rotator body with respect to the center of balance shaft 1 in order that balance weight 3 rotates without hitting or cleaving the oil.

In this configuration, when balance weight 3 has an arch surface radially and eccentrically protruding from the axial center of balance shaft 1, balance cover 5 may be formed to have a structure defining smooth curved outline connected with both ends of the arc surface of balance weight 3 when being combined with balance weight 3 to cover balance shaft 1.

That is, as long as balance cover 5 has a shape connected with both ends of the arch surface of protruding balance weight 3, forming a smooth curved outline without forming a complete circular rotator about the center of balance shaft 1 together with balance weight 3, the rotational resistance of the oil against balance weight 3 can be largely reduced than now.

Balance cover 5 has a hollow shell structure, which has locking protrusions 7 to be fixed to balance weight 3 and balance weight 3 has locking grooves 9 to receive locking protrusions 7.

In the present embodiment, balance weight 3 is formed in a semicircular cross-sectional column having an arc surface 11 protruding outside from the center of balance shaft 1, balance cover 5 has an arc portion 13 defining the complete circumference together with arc surface 11 of balance weight 3 and flat sides 15 covering both sides of arc portion 13, and locking protrusions 7 bend inward from both ends of arc portion 13.

Further, balance weight 3 has locking grooves 9 at both side ends of arc surface 11 such that locking protrusions 7 are inserted therein by self-elastic force of balance cover 5.

For reference, although FIG. 2 exemplifies when only one balance weight 3 is equipped with balance cover 5, it is preferable that the other balance weight 3 are equipped with balance covers 5.

Further, the balance cover may be formed to be more firmly combined with the balance weight by, not the locking protrusions and locking groove, but fixing bolts.

With balance cover 5 combined with balance weight 3, when balance shaft 1 is rotated by the engine, since balance weight 3 defines a complete circular rotator together with balance cover 5, a discontinuous surface that collides with the oil is removed from the entire rotational phase, such that balance weight 3 does not hit or cleave the oil, thereby preventing churning and considerably reducing rotational resistance.

Therefore, the power for driving balance shaft 1 is reduced, fuel efficiency and power of the engine are improved, noise is reduced, and increase of oil temperature and excessive consumption of the oil are prevented.

For convenience in explanation and accurate definition in the appended claims, the terms "upper", "lower" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A balance shaft module of an engine, comprising:
   a balance weight shaped eccentrically in a radial direction from the axial center of a balance shaft; and
   a balance cover combined with the balance weight and defining a circumferentially-uniform outer surface with the balance weight with respect to the axial center of the balance shaft;
   wherein the balance cover has a hollow shell structure and has locking protrusions, and wherein the balance weight has locking grooves to receive the locking protrusions.

2. The balance shaft module of an engine as defined in claim 1, wherein the circumferentially-uniform outer circumference of the balance cover and the balance weight forms a circular circumference with respect to axial center of the balance shaft.

3. The balance shaft module of an engine as defined in claim 1, wherein
   the balance weight is formed in a semicircular cross-sectional column having an arc surface protruding outside from the axial center of the balance shaft,
   the balance cover has an arc portion defining the uniform outer circumference together with the arc surface of the balance weight and flat sides connected to both lateral sides of the arc portion to cover the balance shaft, and
   the locking protrusions bend inward from both side ends of the arc portion.

4. A balance shaft module of an engine, comprising:
   a balance weight having an arch surface radially and eccentrically protruding from the axial center of a balance shaft; and
   a balance cover formed to have a structure defining smooth curved surface connected with both side ends of the arc surface of the balance weight when being combined with the balance weight to cover the balance shaft;
   wherein the balance cover is formed of a hollow shell shape,
   the balance cover has locking protrusions to be combined with the balance weight, and
   the balance weight has locking grooves where the locking protrusions are inserted.

* * * * *